United States Patent
Kang (10) Patent No.: US 8,019,231 B2
(45) Date of Patent: Sep. 13, 2011

(54) OPTICAL PATTERN RECOGNITION HAVING REDUCED SENSITIVITY TO WAVELENGTH INSTABILITY

(75) Inventor: Inuk Kang, Matawan, NJ (US)

(73) Assignee: Alcatel Lucent, Paris (FR)

( * ) Notice: Subject to any disclaimer, the term of this patent is extended or adjusted under 35 U.S.C. 154(b) by 703 days.

(21) Appl. No.: 11/874,510

(22) Filed: Oct. 18, 2007

(65) Prior Publication Data

US 2009/0226183 A1    Sep. 10, 2009

(51) Int. Cl.
*H04B 10/00*    (2006.01)

(52) U.S. Cl. ............................... 398/175; 398/9; 398/25

(58) Field of Classification Search .......... 398/173–181, 398/9, 25
See application file for complete search history.

(56) References Cited

U.S. PATENT DOCUMENTS

| | | | |
|---|---|---|---|
| 6,208,455 B1 * | 3/2001 | Ueno et al. | 359/332 |
| 6,614,582 B1 * | 9/2003 | Mikkelsen et al. | 359/326 |
| 7,031,047 B2 * | 4/2006 | Parolari et al. | 359/326 |
| 7,057,785 B2 * | 6/2006 | Webb et al. | 359/245 |
| 7,437,083 B2 * | 10/2008 | Lavigne et al. | 398/176 |

OTHER PUBLICATIONS

I. Kang et al., "Regenerative All Optical Wavelength Conversion of 40-Gb/s DPSK Signals Using a Semiconductor Optical Amplifier Mach-Zehnder Interferometer," ECOC 2005, Post Deadline Paper Th 4.3.3 (2005), 2 pages.

* cited by examiner

*Primary Examiner* — Agustin Bello
(74) *Attorney, Agent, or Firm* — Mendelsohn, Drucker & Associates, P.C.; Steve Mendelsohn (57) ABSTRACT

In exemplary embodiments, all-optical pattern recognition for an optical input signal is achieved by wavelength-converting the input signal and then passively correlating the wavelength-converted signal based on a specified data pattern. By performing wavelength conversion using a CW laser signal having wavelength stability greater than that of the input signal, errors resulting from wavelength sensitivity of the passive correlator can be reduced. By performing both wavelength conversion and OOK-to-BPSK format conversion prior to the passive correlation, limitations in the number of available OOK patterns can be avoided. By performing the passive correlation in a bi-directional manner, feedback signal can be generated to control the operations of the passive correlator and/or the laser signal source(s).

29 Claims, 6 Drawing Sheets

OPTICAL PATTERN RECOGNITION HAVING REDUCED SENSITIVITY TO WAVELENGTH INSTABILITY

STATEMENT REGARDING FEDERALLY SPONSORED RESEARCH OR DEVELOPMENT

The Government of the United States of America has rights in this invention pursuant to Contract No. H98230-06-C-0384 awarded by the U.S. Department of Defense.

BACKGROUND OF THE INVENTION

1. Field of the Invention

The present invention relates to optical communications and, more specifically, to all-optical data recognition and routing.

2. Description of the Related Art

One of the bottlenecks in the growth of the internet is the gap between the rate of increase of internet traffic and the slower rate of increase in edge router capacity. The use of optics in data routing has been investigated to relieve the burdens put on routers associated with repeated optical-to-electronic and electronic-to-optical conversions and the intervening electronic data processing. For example, performing header recognition of even a part of standard 32-bit IP headers all optically can greatly simplify the structure of routers and reduce their power consumption.

Optical correlation techniques using passive optical filters are among the most promising ways of implementing all-optical header recognition. Passive optical filters can be realized using a variety of technologies, such as planar-light-wave-circuits (PLCs) or fiber Bragg gratings. When the spectral response of the filter matches the complex conjugate of the spectrum of the target data pattern, an autocorrelation syndrome pulse is generated, which can be subsequently used for control of data routing or other data processing.

One of the key challenges in passive optical correlation techniques has been the difficulties in scaling the filters to process a large number of header bits. Passive correlator filters are typically constructed using multiple optical delays with the longest temporal delay proportional to the number of header bits. However, the requirement for wavelength stability has not been quantitatively analyzed previously, while it is expected to vary quite nonlinearly with respect to the number of bits. Another challenge is the inability of passive correlation techniques to distinguish arbitrary on-off-keyed (OOK) data bits. In the past, a special set of orthogonal code words that generate mutually distinct correlation signals was used for OOK signals, which limits the number of header patterns that can be used for OOK.

SUMMARY OF THE INVENTION

In one embodiment, the invention is an apparatus for performing pattern recognition on a data-modulated optical input signal having a first wavelength. The apparatus comprises a laser, a converter, and a correlator. The laser generates a laser signal having a second wavelength different from the first wavelength. The converter receives the laser signal and the input signal and wavelength converts the input signal into a data-modulated converted optical signal having the second wavelength. The correlator receives the converted signal and generates an optical output signal indicative of a correlation between the data modulation of the input signal and a specified data pattern.

In another embodiment, the invention is a method for performing pattern recognition on a data-modulated optical input signal having a first wavelength. The method comprises (a) wavelength converting the input signal from the first wavelength to a second wavelength different from the first wavelength and (b) correlating the converted optical signal based on a specified data pattern to generate a correlation signal indicative of whether the data modulation of the input signal matches the specified data pattern.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Figure 1:
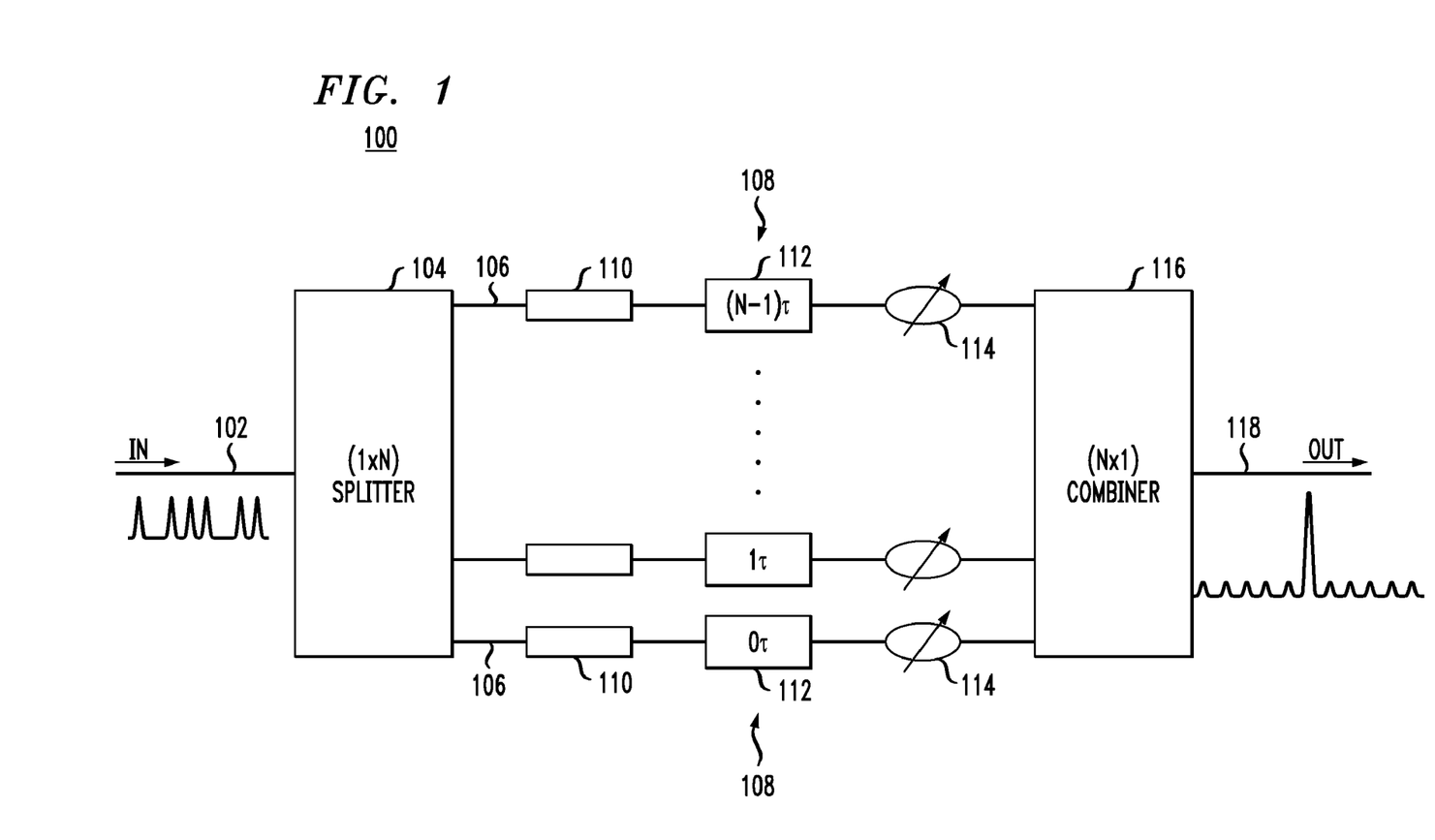
FIG. 1 shows a block diagram of a prior-art passive optical correlator that can be used for optical pattern recognition of header data.

FIG. 1 shows a block diagram of a prior-art passive optical correlator 100, which can be used for optical pattern recognition of header data. Passive optical correlator 100 receives an optical input signal 102 corresponding to N bits of header data and generates an optical output signal 118 indicative of whether the N bits of header data in input signal 102 match a specified N-bit data pattern. If the N bits of header data in input signal 102 perfectly match the specified N-bit data pattern, then output signal 118 will contain a single pulse of maximal amplitude. If one or more bits in input signal 102 do not match corresponding bits in the specified N-bit data pattern, then output signal 118 may contain no pulses or a single pulse having an amplitude less than the maximal amplitude level. Downstream processing of output signal 118 (not shown in FIG. 1) can be employed to determine whether or not output signal 118 indicates a perfect match between the N bits of header data in input signal 102 and the specified N-bit data pattern.

In particular, in passive optical correlator 100, a (1×N) splitter 104 splits optical input signal 102 into N identical copies 106. Each optical signal copy 106 is applied to a different one of N optical paths 108, where each optical path corresponds to a different one of the N bits of header data, which in turn corresponds to a different bit in the specified N-bit data pattern. Each optical path 108 comprises an independently controllable phase shifter 110, an optical delay element 112, and an independently controllable variable optical attenuator (VOA) 114.

For a binary phase shift keying (BPSK)-modulated input signal, each phase shifter 110 is independently configured by a controller (not shown in FIG. 1) to apply a phase shift of either 0 degrees or 180 degrees depending on the value of the corresponding bit in the specified N-bit data pattern. For example, in one possible implementation, if the corresponding bit value is a zero, then phase shifter 110 is configured to apply a 0-degree phase shift, while phase shifter 110 is configured to apply a 180-degree phase shift, if the corresponding bit value is a one.

Different phase-shift schemes might apply for input signals having data modulation other than BPSK. For example, for a quadrature PSK (QPSK)-modulated input signal, each phase shifter 110 is independently configured to apply a phase shift of 0, 90, 180, or 270 degrees. For an on-off-keying (OOK)-modulated input signal encoded with orthogonal codes, all phase shifters 110 are configured to apply the same phase shift. In the following descriptions, unless otherwise specified, input signals are assumed to be BPSK-modulated signals.

Each optical delay element 112 applies a temporal delay to the corresponding phase-shifted optical signal based on the position of the corresponding bit in the specified N-bit data pattern. In the particular implementation shown in FIG. 1, the shortest delay is zero and the longest delay is $(N-1)\tau$, where $\tau$ is the duration of one bit in the optical signal. Note that, in this implementation, the shortest-delay path can be implemented without any delay element. Other sets of delay elements can be implemented (e.g., a set having a shortest delay of $\tau$ and a longest delay of $N\tau$), as long as the sequence of one-bit increments between optical paths is maintained. Note that the optical paths do not necessarily need to be arranged with a one-bit increment between each pair of adjacent paths, as in FIG. 1, as long as a sequence of one-bit increments is achieved over the entire set of optical paths.

Each variable optical attenuator 114 is independently configured by the controller to apply an appropriate attenuation level to the corresponding delayed, phase-shifted optical signal. In matched filtering, the VOAs are set such that the transmissions through the N arms are equalized. However, in multiple-object discriminant filtering, the transmissions do not have to be equalized. Note that, in some implementations, one or more or even all of the attenuators may be omitted.

Note that, since the elements in each optical path are ideally linear optical elements, the sequence of elements within each path may be rearranged.

The N attenuated, delayed, phase-shifted optical signals from the N optical paths 108 are applied to an (N×1) optical power combiner 116, which linearly combines (sums) the N optical signals to generate optical output signal 118. In general terms, output signal 118 corresponds to a cross correlation between optical input signal 102 and the overall filter transfer function of the N optical paths 108. Autocorrelation occurs when input signal 102 perfectly matches the specified N-bit data pattern.

When input signal 102 is a signal modulated based on binary phase-shift keying (BPSK), optical pattern recognition can be implemented by comparing the peak signal amplitude in cross-correlation output signal 118 with the autocorrelation syndrome pulse amplitude for the specified N-bit data pattern, except for an ambiguity of getting the same cross-correlation signal for the specified N-bit data pattern and its parity-inverted version.

On the other hand, when input signal 102 is a signal modulated based on on-off keying (OOK), optical pattern recognition by comparing correlation signal peaks is not effective for recognizing many possible specified N-bit data patterns. Instead, the N-bit data patterns are limited to a relatively small subset of patterns consisting of orthogonal codes that yield distinguishable correlation signals. As such, the number of different data patterns available for use as headers can be significantly limited for OOK input signals.

Another limitation of the correlation technique of FIG. 1, regardless of the signal modulation format, is the sensitivity of the correlator to the wavelength of the signal optical carrier. Due to this sensitivity to carrier wavelength, correlator 100 needs to be uniquely tuned using phase shifters 110 and VOAs 114 for the specific carrier wavelength of the input signal. Deployment of header recognition based on optical correlation in dense wavelength division multiplexing (DWDM) networks would therefore involve maintaining many look-up tables for correlator control adjustments for the different signal wavelengths.

Wavelength sensitivity also manifests as a limitation on the length of the data patterns that can be identified using the passive correlation technique. This limitation is caused by the interplay between the stability of the signal wavelength and the aforementioned wavelength sensitivity of the passive correlator.

Figure 2:
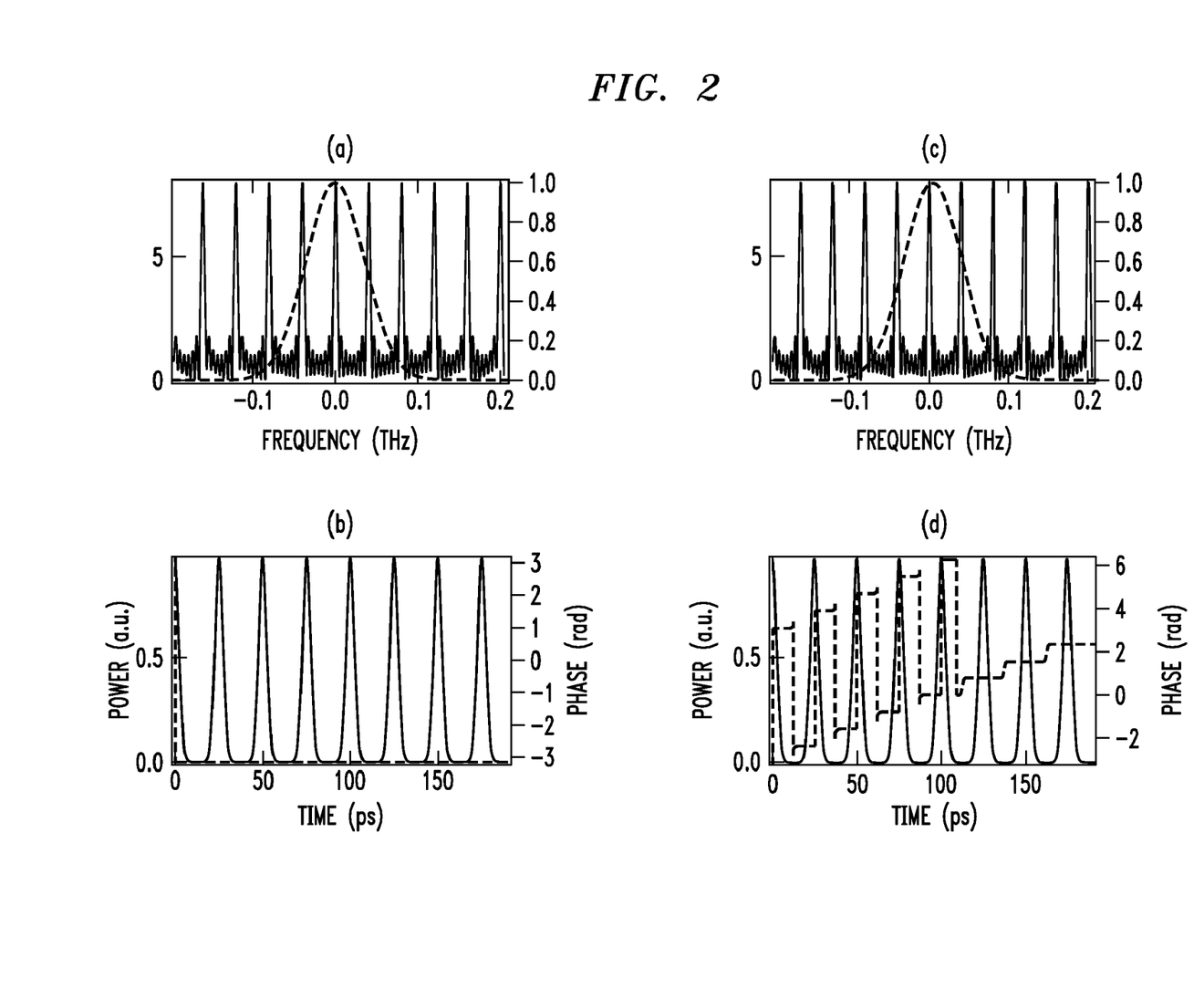
FIG. 2 illustrates the consequence of wavelength sensitivity by comparing the spectral responses and impulse temporal responses of the correlator of FIG. 1 in two instances of 8-bit pattern recognition at 40 Gb/s: one where the signal central wavelength matches the intended wavelength of the correlator and the other where the signal wavelength deviates from the target wavelength.

FIG. 2 illustrates the consequence of wavelength sensitivity by comparing the spectral responses and impulse temporal responses of the correlator of FIG. 1 in two instances of pattern recognition at 40 Gb/s for the specified 8-bit data pattern of [11111111]: one where the signal central wavelength matches the intended wavelength of the correlator and the other where the signal wavelength deviates from the target wavelength. The wavelength offset results in imparting linear temporal phase on the impulse response of the correlator. FIG. 2(a) shows the spectral amplitude response of the passive correlator and the spectral intensity of the input signal when the input spectrum is aligned with respect to the correlator response. FIG. 2(b) shows the impulse response of the correlator for the input signal spectrum shown in FIG. 2(a). FIG. 2(c) shows the spectral amplitude response of the passive correlator and the spectral intensity of the input signal when the input spectrum is misaligned with respect to the correlator response by 40 picometers (pm). FIG. 2(d) shows the impulse response of the correlator for the input signal spectrum shown in FIG. 2(c). As shown in FIG. 2(d), a wavelength mismatch of 40 pm results in deviation in phase by about 4 radians for the longest delay arm.

Figure 3:
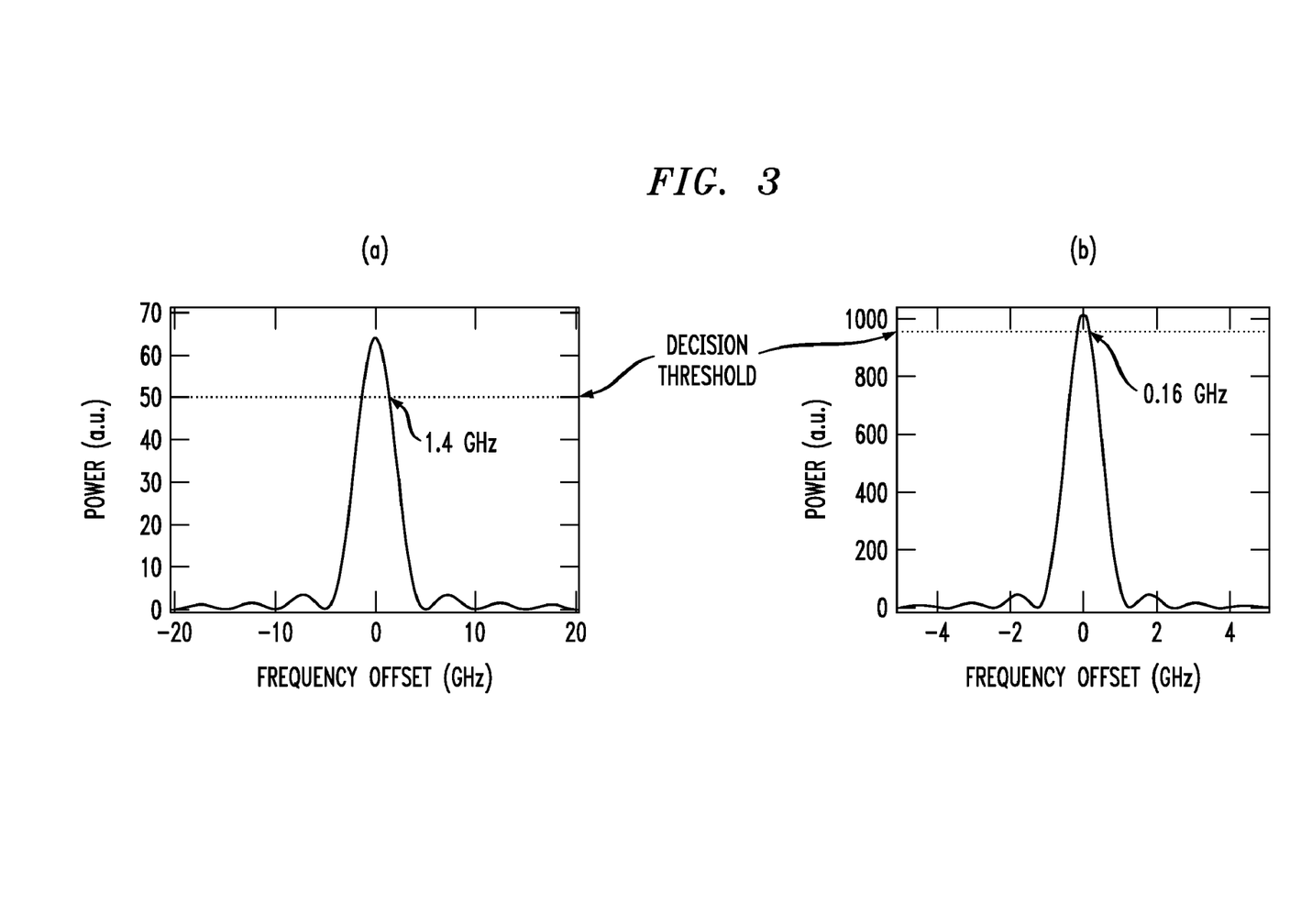
FIG. 3 shows the peak intensity of the autocorrelation signal generated by correlating a 40-Gb/s binary phase shift keying (BPSK) signal with passive correlators as a function of the wavelength mismatch.

The required wavelength stability can be estimated by calculating the magnitude of the autocorrelation peak as a function of the wavelength shift. FIG. 3 shows the peak intensity of the autocorrelation signal generated by correlating a 40-Gb/s BPSK signal with passive correlators as a function of the wavelength mismatch. FIG. 3(a) shows the intensity of the autocorrelation peak as a function of the optical frequency offset in the case of 8-bit BPSK recognition, while FIG. 3(b) shows the intensity of the autocorrelation peak as a function of the optical frequency offset in the case of 32-bit BPSK recognition.

As shown in FIG. 3(a), if the threshold is set at the median value between the autocorrelation and the next-highest cross-correlation (i.e., 7-bit matching), then a wavelength shift of 1.4 GHz (11 pm) would completely nullify the ability to distinguish the autocorrelation from the next highest cross-correlation. For successful pattern matching, the stability of the signal wavelength should exceed this. However, typical long-term stability of commercial transponders does not satisfy this criterion for 8-bit pattern matching.

The situation is even worse for matching a larger number of target bits. As indicated in FIG. 3(b), the tolerance of 32-bit matching at 40 Gb/s to the wavelength shift is 0.16 GHz (1.2 pm), substantially smaller than that for 8-bit matching. This sensitivity to wavelength mismatch is quite acute considering the fact that the routers would not have control over the transmitters located at the origin of the data transmission without some form of complicated bi-directional communications.

Figure 4:
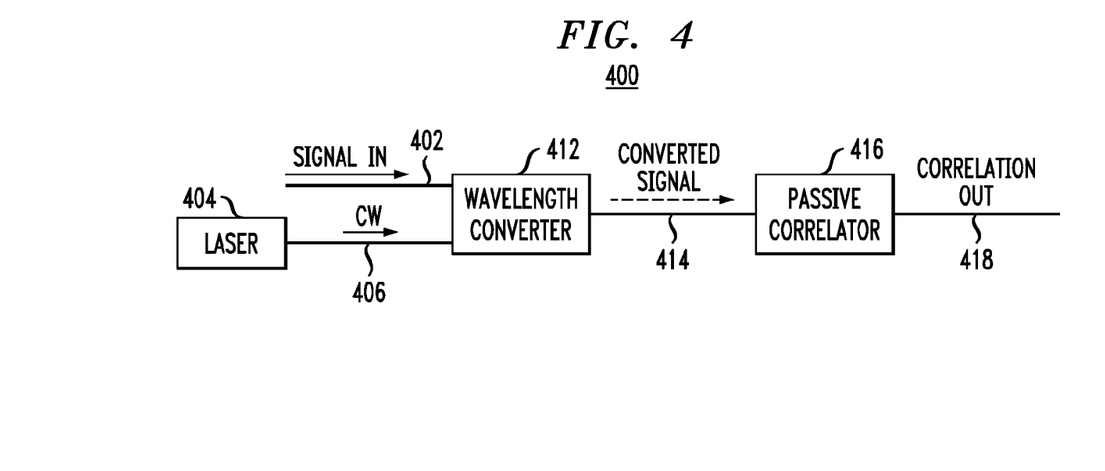
FIG. 4 shows a block diagram of an optical pattern recognition system, according to one embodiment of the present invention.

FIG. 4 shows a block diagram of an optical pattern recognition system 400, according to one embodiment of the present invention. Like correlator 100 of FIG. 1, optical pattern recognition system 400 receives an optical input signal 402 corresponding to N bits of header data and generates an optical output signal 418 indicative of whether the N bits of header data in input signal 402 match a specified N-bit data pattern.

Optical pattern recognition system 400 comprises laser 404, wavelength converter 412, and passive correlator 416. In one implementation, passive correlator 416 is based on passive correlator 100 of FIG. 1. In addition to data-modulated input signal 402, wavelength converter 412 also receives a continuous wave (CW) laser signal 406 from laser 404 and generates a data-modulated wavelength-converted optical signal 414, whose wavelength is the wavelength of CW laser signal 406 (which is different from the wavelength of input signal 402), but is modulated to carry the same information as data-modulated input signal 402. Converted signal 414 is then applied to passive correlator 416 which generates optical output signal 418 in the same manner described previously for correlator 100 of FIG. 1.

By implementing laser 404 to ensure generation of CW laser signal 406 having a level of wavelength stability greater than that of optical input signal 402, the operations of pattern recognition system 400 are less sensitive to temporal variations (i.e., instability) in the wavelength of input signal 402 than if input signal 402 were applied directly to passive correlator 416.

Figure 5:
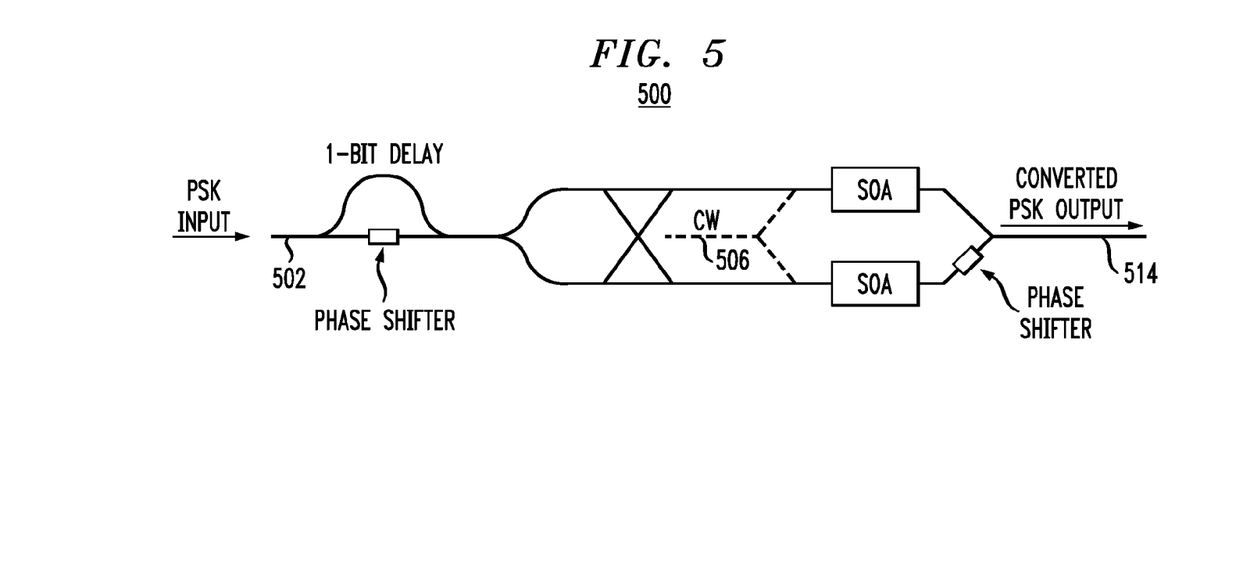
FIG. 5 shows a schematic block diagram of a wavelength converter that can be used to implement the wavelength converter of FIG. 4.

FIG. 5 shows a schematic block diagram of wavelength converter 500, which can be used to implement wavelength converter 412 of FIG. 4. The architecture and functionality of wavelength converter 500 are described in U.S. patent application Ser. No. 11/162,938, filed on Sep. 28, 2005, and in I. Kang et al., "Regenerative all optical wavelength conversion of 40-Gb/s DPSK signals using a semiconductor optical amplifier Mach-Zehnder interferometer," ECOC 2005, post deadline paper Th 4.3.3 (2005), the teachings of both of which are incorporated herein by reference. As represented in FIG. 5, based on CW laser signal 506, wavelength converter 500 converts a BPSK-modulated optical input signal 502 into a wavelength-converted BPSK-modulated optical output signal 514, whose wavelength is the same as the wavelength of CW laser signal 506 and which carries the same information as that of input signal 502.

Other types of wavelength converters based on incoherent optical processes could be used for wavelength converter 500.

Figure 6:
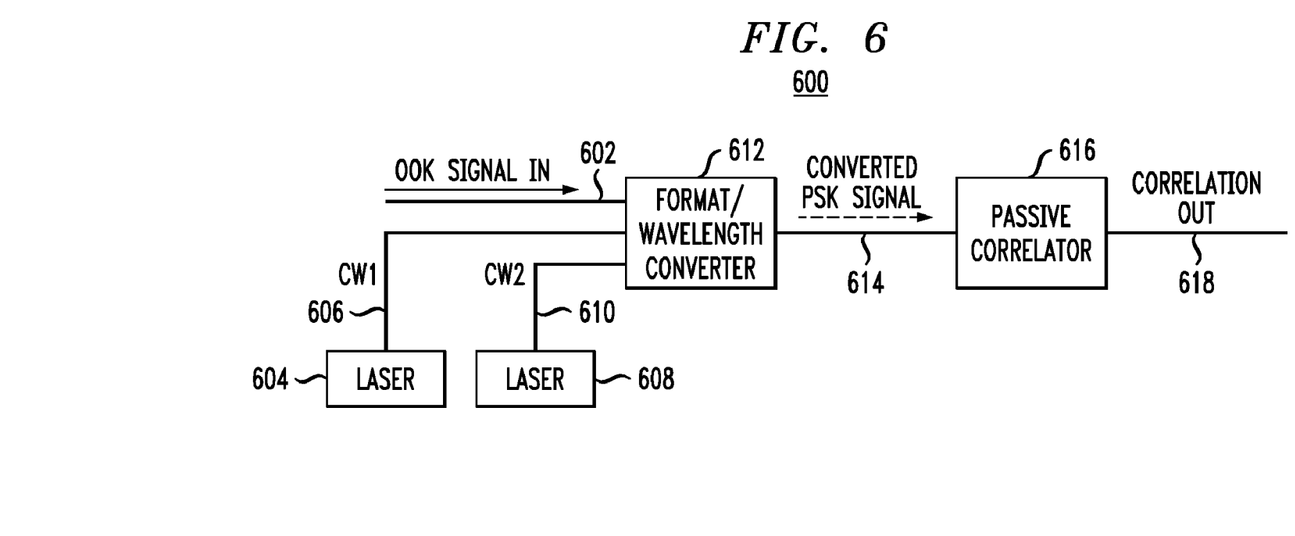
FIG. 6 shows a block diagram of an optical pattern recognition system, according to another embodiment of the present invention.

FIG. 6 shows a block diagram of an optical pattern recognition system 600, according to another embodiment of the present invention. Like optical pattern recognition system 400 of FIG. 4, optical pattern recognition system 600 receives an optical input signal 602 corresponding to N bits of header data and generates an optical output signal 618 indicative of whether the N bits of header data in input signal 602 match a specified N-bit data pattern. Unlike recognition system 400, however, recognition system 600 is designed to perform pattern recognition on OOK-modulated input signals.

Optical pattern recognition system 600 comprises two lasers 604 and 608, format/wavelength converter 612, and passive correlator 616. In one implementation, passive correlator 616 is based on passive correlator 100 of FIG. 1. In addition to OOK-modulated input signal 602, format/wavelength converter 612 also receives two CW laser signals: CW1 signal 606 from laser 604 and CW2 signal 610 from laser 608. In addition to converting the wavelength of input signal 602 to the wavelength of one of the two laser signals (e.g., in one possible implementation, the wavelength of CW2 signal 610), converter 612 also converts the format of input signal 602 from OOK-modulation to BPSK-modulation. As a result, converter 612 generates converted optical signal 614 having the wavelength of CW2 signal 610 and the same data modulation in BPSK format as that in input signal 602 in OOK format.

As in converter 400 of FIG. 4, by implementing laser 608 to ensure generation of CW2 laser signal 608 having a level of wavelength stability greater than that of optical input signal 602, the operations of pattern recognition system 600 are less sensitive to wavelength instability of input signal 602 than if input signal 602 were applied directly to passive correlator 616. Note that the wavelength stability of laser 604 is not as important as that of laser 608.

Figure 7:
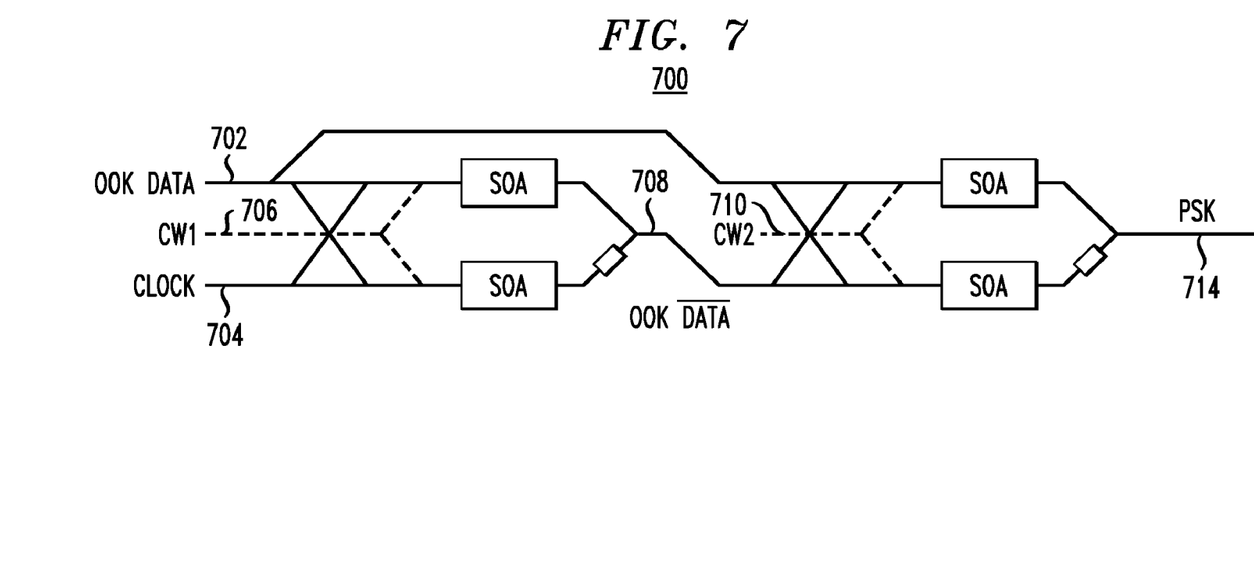
FIG. 7 shows a schematic block diagram of a format/wavelength converter that can be used to implement the format/wavelength converter of FIG. 6.

FIG. 7 shows a schematic block diagram of format/wavelength converter 700, which can be used to implement format/wavelength converter 612 of FIG. 6. The architecture and functionality of format/wavelength converter 700 are based on an extension of the architecture and functionality of wavelength converter 500 of FIG. 5. As represented in FIG. 7, based on CW laser signals 706 and 710, format/wavelength converter 700 converts an OOK-modulated optical input signal 702 into a format-and-wavelength-converted BPSK-modulated optical output signal 714, whose wavelength is the same as the wavelength of CW2 laser signal 710 and which has data modulation the same as that of input signal 702. In particular, based on optical input clock signal 704 and CW1 laser signal 706, the first stage of the two-stage converter converts OOK-modulated input signal 702 into OOK-modulated optical signal 708 at the wavelength of CW1 laser signal 706 and having data modulation that is the logical inversion of that of input signal 702, while converter 700's second stage converts OOK-modulated optical signals 702 and 708 into BPSK-modulated output signal 714. The frequency of optical input clock signal 704 should match the bit rate of OOK-modulated optical input signal 702.

Referring again to FIG. 6, by converting input signal 602 in OOK format into converted signal 614 in BPSK format, pattern recognition system 600 is able to perform optical pattern recognition on arbitrary OOK patterns (with the exception of the ambiguity between parity-inverted data patterns associated with BPSK signals), thereby increasing the potential of wider adoption of the passive correlation technique for header processing.

Figure 8:
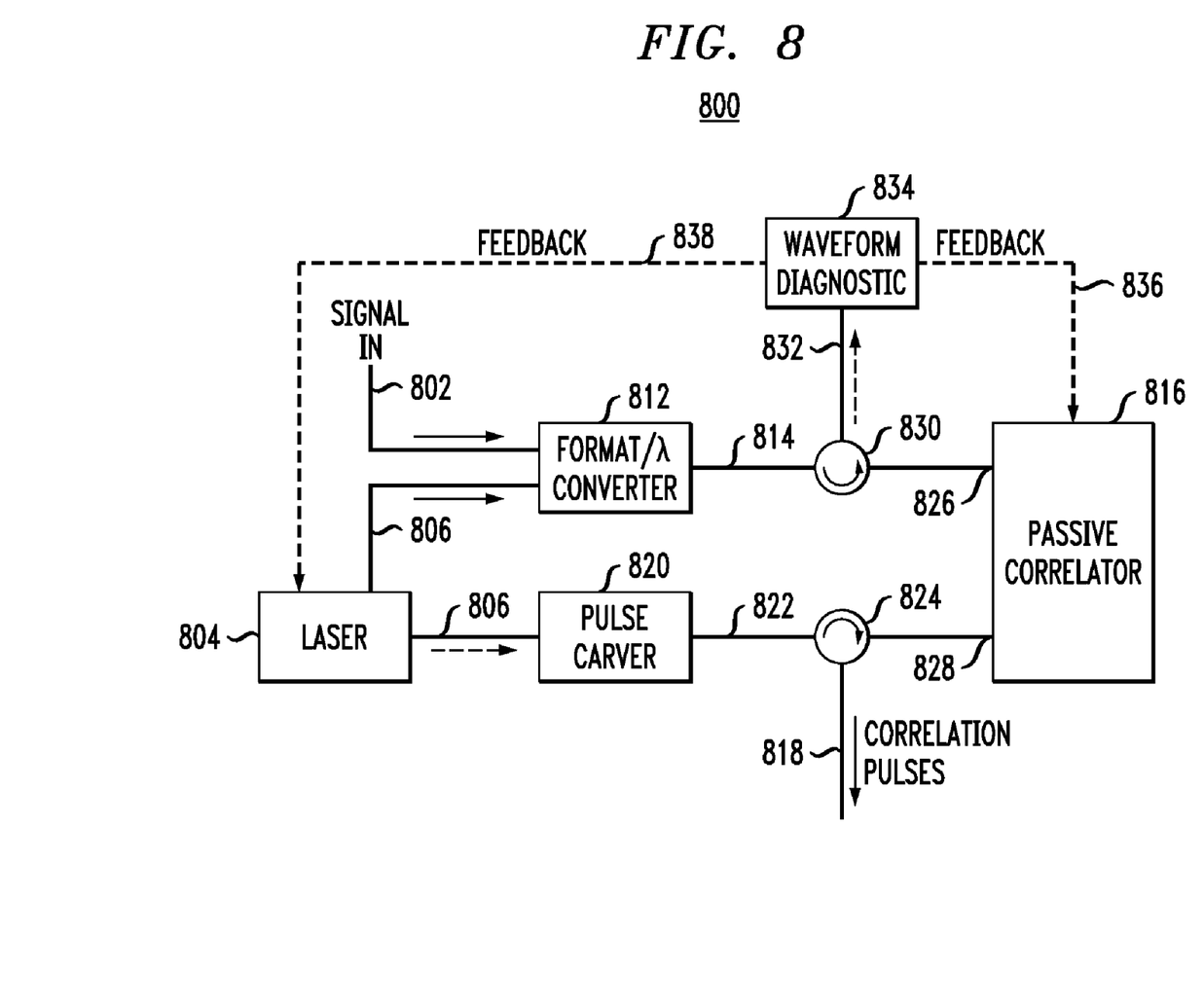
FIG. 8 shows a block diagram of an optical pattern recognition system, according to yet another embodiment of the present invention.

FIG. 8 shows a block diagram of an optical pattern recognition system 800, according to yet another embodiment of the present invention. Recognition system 800 may be implemented as an extension of either recognition system 400 of FIG. 4 or recognition system 600 of FIG. 6. When implemented as an extension of recognition system 400, converter 812 is implemented based on wavelength converter 500 of FIG. 5, and recognition system 800 has one laser 804 similar to laser 404 of FIG. 4. When implemented as an extension of recognition system 600, converter 812 is implemented based on format/wavelength converter 700 of FIG. 7, and recognition system 800 has two lasers 804 similar to lasers 604 and 608 of FIG. 6. In either implementation, passive correlator 816 is based on passive correlator 100 of FIG. 1.

In addition to these elements, recognition system 800 also includes pulse carver 820, optical circulators 824 and 830, and waveform diagnostic block 834. Pulse carver 820 converts CW laser signal 806 into pulse-carved optical signal 822.

Recognition system 800 is designed to take advantage of the bi-directional functionality of passive correlator 816. In addition to being able to receive converted optical signal 814 from converter 812 at "input" port 826 of correlator 816 and present optical output signal 818 at "output" port 828 of correlator 816, correlator 816 is also able to receive pulse-carved laser signal 822 generated by pulse carver 820 at "output" port 828 and present optical correlation signal 832 at "input" port 826.

When implemented based on correlator 100 of FIG. 1, the bi-directional functionality of passive correlator 816 implies that (N×1) combiner 116 of FIG. 1 functions as a (1×N) splitter for pulse-carved laser signal 822, and (1×N) splitter 104 of FIG. 1 functions as an (N×1) combiner for correlation signal 832. Similarly, each arm 108 of FIG. 1 is implemented using bi-directional, linear elements such that the transfer function of each arm is the same in both directions. As such, the amplitude and phase of correlation signal 832 will faithfully reflect the same impulse response function applied to input signal 102 of FIG. 1.

Circulator 830 routes converted signal 814 from converter 812 into port 826 and routes correlation signal 832 received from port 826 to waveform diagnostic block 834. Similarly, circulator 824 routes the optical signal received from port 828 as output signal 818 and routes pulse-carved laser signal 822 from pulse carver 820 into port 828.

The bi-directional functionality of recognition system 800 can be used to monitor and control phase and amplitude adjustments applied within passive correlator 816. In particular, waveform diagnostic block 834 can monitor correlation signal 832 from passive correlator 816 to determine whether changes need to be made to the phase and/or attenuation settings of any of the phase shifters and/or optical attenuators in correlator 816. Waveform diagnostic block 834 can instruct correlator 816 to make such changes via feedback control signals 836.

Alternatively or in addition, waveform diagnostic block 834 can monitor and control the operations of laser(s) 804 via feedback control signals 838. In particular, since the wavelength of some lasers is a function of their temperature, waveform diagnostic block 834 can monitor correlation signal 832 to determine whether changes need to be made to the temperature of one or more of laser(s) 804 in order to fine-tune the wavelength(s) of the generated CW laser signal(s).

Note that the two different directions of optical signal flow in recognition system 800 can be implemented either simultaneously or sequentially.

In one implementation of recognition system 800, the repetition rate of the pulse train generated by pulse carver 820 is less than the symbol rate of input signal 802 divided by the number N of header bits. Using the same CW laser signal for both wavelength conversion and correlation monitoring ensures that the impact of wavelength drift on the optical pattern recognition of input signal 802 can be accurately measured by monitoring pulses in correlation signal 832. For example, if the pulse-carved signal corresponds to a pattern of all logical ones, then waveform diagnostic block 834 can compare correlation signal 832 to the ideal correlation signal for a pattern of all ones to characterize the performance of laser(s) 804 and/or passive correlator 816.

Since wavelength drift can be detected by monitoring the linear temporal phase in the impulse response of the passive correlator, wavelength drift can be corrected using the measured linear temporal phase to adjust the operating temperature of the laser(s).

After correcting the wavelength drift, the impulse responses can be further examined and, if there are any discrepancies between the intended and measured response functions, they can be corrected by adjusting the phase shift and/or attenuation controls of the passive correlator. Although, the wavelength drift can be compensated for using the passive correlator controls only, the aforementioned procedure greatly minimizes the number of controls required. The feedback system is thus capable of eliminating most if not all of the penalties associated with wavelength instability and errors in the tuning of the passive correlator. Note that the feedback processing of recognition system 800 can reduce the requirements on the wavelength stability of the now actively controlled CW laser(s), thereby reducing the cost of the CW source and partially compensating for the increased cost due to the feedback control. More importantly, optical pattern recognition with such feedback can eliminate the penalties arising from wavelength mismatch and/or tuning errors.

In certain embodiments, pattern recognition systems of the present invention are implemented as a single integrated device on a common substrate.

The present invention has been described in the context of applications in which the input signal is a BPSK-modulated signal, and the converter converts the BPSK-modulated input signal into a wavelength-converted BPSK-modulated signal as well as applications in which the input signal is an OOK-modulated signal, and the converter converts the OOK-modulated input signal into a format-and-wavelength-converted BPSK-modulated signal. The present invention can also be implemented in other contexts. For example, in one application, the input signal is a QPSK-modulated signal, and the converter converts the QPSK-modulated input signal into a wavelength-converted QPSK-modulated signal. In another application, the input signal is an OOK-modulated signal, and the converter converts the OOK-modulated input signal into a wavelength-converted OOK-modulated signal.

Although the present invention has been described in the context of pattern recognition systems implemented using passive optical correlators that are based on passive optical correlator 100 of FIG. 1, the present invention can also be implemented using other types of correlators. For example, the present invention can be implemented as recognition systems relying on other types of passive filtering, including those implemented with fiber optical Bragg gratings or arrayed-waveguide-grating routers.

Although the present invention has been described in the context of all-optical pattern recognition, the present invention can also be implemented in the context of pattern recognition in which some of the functionality is implemented in the electronic domain. For example, some or all of the passive correlation can be implemented in the electronic domain.

Although the present invention has been described in the context of pattern recognition for optical headers, the present invention can also be implemented in optical pattern recognition applications other than those for optical headers.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. Apparatus for performing pattern recognition on a data-modulated optical input signal having a first wavelength, the apparatus comprising:
    a laser adapted to generate a laser signal having a second wavelength different from the first wavelength;
    a converter adapted to receive the laser signal and the input signal and wavelength convert the input signal into a data-modulated converted optical signal having the second wavelength; and
    a correlator adapted to receive the converted signal and generate an optical output signal indicative of a correlation between the data modulation of the input signal and a specified data pattern, wherein the converter comprises:
        a first stage connected to receive the input signal, the laser signal, and a clock signal and generate a logic-inverted signal; and
        a second stage connected to receive the input signal, a second laser signal, and the logic-inverted signal and generate the data-modulated converted optical signal.

2. The invention of claim 1, wherein the laser signal has wavelength stability greater than that of the input signal.

3. The invention of claim 1, wherein:
    if the data modulation of the input signal perfectly matches the specified data pattern, then the output signal has a peak at a maximal amplitude level; and
    if the data modulation of the input signal does not perfectly match the specified data pattern, then the output signal has one or more peaks, with a largest peak having an amplitude less than the maximal amplitude level.

4. The invention of claim 1, wherein:
    the laser is a constant-wavelength (CW) laser;
    the converter is an all-optical converter; and
    the correlator is an all-optical passive correlator.

5. The invention of claim 1, wherein the correlator comprises:
    a splitter adapted to convert the input signal into a plurality of copies of the input signal, each copy corresponding to a different bit in the specified data pattern;
    an optical path for each copy of the input signal, wherein:
        each optical path is adapted to controllably apply, to the corresponding copy, a phase shift corresponding to a value of the corresponding bit in the specified bit pattern; and
        each optical path is adapted to apply, to the corresponding copy, a delay corresponding to a position of the corresponding bit in the specified bit pattern; and
    a combiner adapted to combine the outputs from the plurality of optical paths to generate the output signal.

6. The invention of claim 5, wherein:
    the optical path is adapted to apply a zero-bit phase shift to the corresponding copy, if the corresponding bit value is zero;
    the optical path is adapted to apply a one-bit phase shift to the corresponding copy, if the corresponding bit value is one, wherein the one-bit phase shift differs from the zero-bit phase shift by approximately 180 degrees;
    the plurality of optical paths are adapted to apply the delays to the plurality of copies in a sequence of one-bit increments; and
    each optical path is adapted to controllably attenuate the corresponding copy.

7. The invention of claim 6, wherein each of one or more optical paths comprises:
    a phase shifter adapted to apply the phase shift to the corresponding copy;
    a delay element adapted to apply the delay to the corresponding copy; and
    a variable optical attenuator adapted to attenuate the corresponding copy.

8. The invention of claim 1, wherein:
    the input signal is a BPSK-modulated signal;
    the converted signal is a BPSK-modulated wavelength-converted signal; and
    the converter is adapted to convert the BPSK-modulated input signal into the BPSK-modulated wavelength-converted signal.

9. The invention of claim 1, wherein:
    the input signal is an OOK-modulated signal;
    the converted signal is a BPSK-modulated wavelength-converted signal; and
    the converter is adapted to convert the OOK-modulated input signal into the BPSK-modulated wavelength-converted signal.

10. The invention of claim 9, wherein the converter comprises:
- a first stage adapted to convert the OOK-modulated input signal into an inverted OOK-modulated optical signal having OOK modulation corresponding to a logic inversion of that of the OOK-modulated input signal; and
- a second stage adapted to convert the OOK-modulated input signal and the inverted OOK-modulated signal into the BPSK-modulated wavelength-converted optical signal.

11. The invention of claim 1, wherein:
the input signal is a QPSK-modulated signal;
the converted signal is a QPSK-modulated wavelength-converted signal; and
the converter is adapted to convert the QPSK-modulated input signal into the QPSK-modulated wavelength-converted signal.

12. The invention of claim 1, wherein:
the input signal is an OOK-modulated signal;
the converted signal is an OOK-modulated wavelength-converted signal; and
the converter is adapted to convert the OOK-modulated input signal into the OOK-modulated wavelength-converted signal.

13. The invention of claim 1, further comprising:
- a pulse carver adapted to generate a pulse-carved version of the laser signal, wherein the correlator is adapted to process the pulse-carved signal to generate a correlation signal in a signal-flow direction opposite that of the converted signal from the converter; and
- a waveform diagnostic block adapted to monitor the correlation signal to generate one or more control signals for controlling one or more of the laser and the correlator.

14. The invention of claim 13, wherein the one or more control signals are adapted to control one or more of phase shifts and attenuation in the correlator.

15. The invention of claim 13, wherein the one or more control signals are adapted to control the wavelength of the laser signal generated by the laser.

16. The invention of claim 15, wherein the one or more control signals are adapted to control operating temperature of the laser to control the wavelength of the laser signal generated by the laser.

17. The invention of claim 1, wherein the apparatus is implemented as a single integrated device on a common substrate.

18. The invention of claim 1, wherein the converter is adapted to operate based on incoherent optical processes.

19. The invention of claim 1, wherein:
the first stage comprises a first Mach-Zehnder (MZ) interferometer connected to receive the input signal, the laser signal, and the clock signal and generate the logic-inverted signal; and
the second stage comprises a second MZ interferometer connected to receive the input signal, the second laser signal, and the logic-inverted signal and generate the data-modulated converted optical signal.

20. The invention of claim 19, wherein the data-modulated converted output signal has a different format from the input signal.

21. The invention of claim 20, wherein:
the format of the input signal is OOK; and
the format of the data-modulated converted output signal is QPSK.

22. A method for performing pattern recognition on a data-modulated optical input signal having a first wavelength, the method comprising:
- (a) wavelength converting the input signal from the first wavelength to a second wavelength different from the first wavelength; and
- (b) correlating the converted optical signal based on a specified data pattern to generate a correlation signal indicative of whether the data modulation of the input signal matches the specified data pattern, wherein step (a) comprises:
  - (a1) a first stage receiving the input signal, the laser signal, and a clock signal and generating a logic-inverted signal; and
  - (a2) a second stage receiving the input signal, a second laser signal, and the logic-inverted signal and generating the data-modulated converted optical signal.

23. The invention of claim 22, wherein the wavelength conversion is implemented using a laser signal having (i) the second wavelength and (ii) wavelength stability greater than that of the input signal.

24. The invention of claim 22, wherein:
the input signal is an OOK-modulated input signal; and
step (a) further comprises format converting the input signal from OOK format to BPSK format.

25. The invention of claim 24, wherein the wavelength and format conversions are implemented using first and second laser signals, wherein the second laser signal has (i) the second wavelength and (ii) wavelength stability greater than that of the input signal.

26. The invention of claim 22, wherein:
the first stage comprises a first Mach-Zehnder (MZ) interferometer connected to receive the input signal, the laser signal, and the clock signal and generate the logic-inverted signal; and
the second stage comprises a second MZ interferometer connected to receive the input signal, the second laser signal, and the logic-inverted signal and generate the data-modulated converted optical signal.

27. Apparatus for performing pattern recognition on a data-modulated optical input signal having a first wavelength, the apparatus comprising:
- (a) means for wavelength converting the input signal from the first wavelength to a second wavelength different from the first wavelength; and
- (b) means for correlating the converted optical signal based on a specified data pattern to generate a correlation signal indicative of whether the data modulation of the input signal matches the specified data pattern, wherein means (a) comprises:
  - a first stage connected to receive the input signal, the laser signal, and a clock signal and generate a logic-inverted signal; and
  - a second stage connected to receive the input signal, a second laser signal, and the logic-inverted signal and generate the data-modulated converted optical signal.

28. The invention of claim 27, wherein:
the input signal is an OOK-modulated signal;
the converted signal is a BPSK-modulated wavelength-converted signal; and
means (a) is adapted to convert the OOK-modulated input signal into the BPSK-modulated wavelength-converted signal.

29. The invention of claim 27, wherein:

the first stage comprises a first Mach-Zehnder (MZ) interferometer connected to receive the input signal, the laser signal, and the clock signal and generate the logic-inverted signal; and the second stage comprises a second MZ interferometer connected to receive the input signal, the second laser signal, and the logic-inverted signal and generate the data-modulated converted optical signal.

\* \* \* \* \*